US008226368B2

(12) United States Patent
Standish et al.

(10) Patent No.: US 8,226,368 B2
(45) Date of Patent: Jul. 24, 2012

(54) WIND TURBINE AIRFOIL FAMILY

(75) Inventors: Kevin Standish, Erie, CO (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/022,347

(22) Filed: Feb. 7, 2011

(65) Prior Publication Data

US 2011/0189024 A1 Aug. 4, 2011

Related U.S. Application Data

(63) Continuation-in-part of application No. 11/621,272, filed on Jan. 9, 2007, now Pat. No. 7,883,324.

(51) Int. Cl.
*F01D 5/14* (2006.01)

(52) U.S. Cl. .................... 416/233; 416/DIG. 2

(58) Field of Classification Search ............... 416/223 A, 416/223 R, 242, 243, DIG. 2, DIG. 5; 415/4.1, 415/4.3, 4.5; 290/44, 55
See application file for complete search history.

(56) References Cited

U.S. PATENT DOCUMENTS

| 1,473,066 | A | * | 11/1923 | Wells | 416/235 |
|---|---|---|---|---|---|
| 4,552,511 | A | * | 11/1985 | Sumigawa | 416/242 |
| 5,292,230 | A | | 3/1994 | Brown | |
| 6,068,446 | A | * | 5/2000 | Tangler et al. | 416/223 R |
| 6,503,058 | B1 | | 1/2003 | Selig et al. | |
| 7,883,324 | B2 | * | 2/2011 | Standish et al. | 416/242 |
| 2005/0232778 | A1 | * | 10/2005 | Kakishita et al. | 416/223 R |
| 2008/0166235 | A1 | | 7/2008 | Standish et al. | |

FOREIGN PATENT DOCUMENTS

| EP | 1152148 B1 | 4/2001 |
|---|---|---|
| EP | 1112928 A2 | 7/2001 |

OTHER PUBLICATIONS

Author: C.P. Van Dam, et al; Title: "Innovative Structural and Aerodynamic Design Approaches for large Wind Turbine Blades"; Journal: American Institute of Aeronautics and Astronautics, pp. 1-12.
Author: K. J. Standish, et al.; Title: "Aerodynamic Analysis of Blunt Trailing Edge Airfoils"; Journal: Journal of Solar Energy engineering; Dated: Nov. 2003, vol. 125; pp. 479-487.
Non-final Office Action and Notice of References Cited, mailed for U.S. Appl. No. 11/621,272 on Mar. 1, 2010.
Final Office Action and Notice of References Cited, mailed for U.S. Appl. No. 11/621,272 on Jun. 16, 2010.
Advisory Action, mailed for U.S. Appl. No. 11/621,272 on Aug. 31, 2010.
Notice of Allowance, mailed for U.S. Appl. No. 11/621,272 on Sep. 28, 2010.
Chinese Official Action issued in connection with CN Application No. 200810001367.X, Jan. 26, 2011.

* cited by examiner

*Primary Examiner* — Edward Look
*Assistant Examiner* — Aaron R Eastman
(74) *Attorney, Agent, or Firm* — Sutherland Asbill & Brennan LLP

(57) ABSTRACT

Airfoils are provided for a wind turbine blade that is associated with a wind turbine hub. Each airfoil includes a blunt trailing edge, a substantially oval shaped suction side, and a substantially S-shaped pressure side. The airfoils decrease in cross-sectional area along the turbine blade in a direction extending away from the wind turbine hub.

17 Claims, 3 Drawing Sheets

WIND TURBINE AIRFOIL FAMILY

CROSS-REFERENCE TO RELATED APPLICATIONS

The present application is a continuation-in-part of U.S. Ser. No. 11/621,272, filed Jan. 9, 2007, which is incorporated by reference herein in its entirety.

TECHNICAL FIELD

The present application relates generally to wind turbines and more particularly relates to a family of airfoil configurations for an inboard region of a wind turbine blade.

BACKGROUND OF THE INVENTION

Conventional wind turbines generally include two or more turbine blades or vanes connected to a central hub. Each blade extends from the hub at a root of the blade and continues to a tip. A cross-section of the blade is defined as an airfoil. The shape of an airfoil may be defined in relationship to a chord line. The chord line is a measure or line connecting the leading edge of the airfoil with the trailing edge of the airfoil. The shape may be defined in the form of X and Y coordinates from the chord line. The X and Y coordinates generally are dimensionless. Likewise, the thickness of an airfoil refers to the distance between the upper surface and the lower surface of the airfoil and is expressed as a fraction of the chord length.

The inboard region, i.e., the area closest to the hub, generally requires the use of relatively thick foils ($30\% \leq t/c \leq 40\%$). The aerodynamic performance of conventional airfoil designs, however, degrades rapidly for thicknesses greater than 30% of chord largely due to flow separation concerns. For thicknesses above 40% of chord, massive flow separation may be unavoidable such that the region of the blade may be aerodynamically compromised. It is noted that the turbine blade often has a circular cross-sectional shape along a connector portion of the turbine blade, which connects the inboard region of the turbine blade to the hub.

Thus, there is a need for an airfoil design that provides improved aerodynamic performance particularly with respect to the inboard region. Preferably, such a design would provide improved aerodynamic performance and efficiency while providing improved structural stiffness and integrity.

BRIEF DESCRIPTION OF THE INVENTION

In some embodiments, a number of airfoils are provided for a wind turbine blade. The wind turbine blade is associated with a wind turbine hub. Each airfoil includes a blunt trailing edge, a substantially oval shaped suction side, and a substantially S-shaped pressure side. The airfoils decrease in cross-sectional area along the turbine blade in a direction extending away from the wind turbine hub.

In other embodiments, a wind turbine blade includes an inboard region, an outboard region, and a tip region. The inboard region includes a plurality of airfoils. Each airfoil includes a blunt trailing edge, a substantially oval shaped suction side, and a substantially S-shaped pressure side. The airfoils decrease in cross-sectional area along the turbine blade in a direction extending away from a wind turbine hub.

In additional embodiments, a turbine blade has a number of airfoils, including a first airfoil, a second airfoil, a third airfoil, and a fourth airfoil. The first airfoil has a profile with non-dimensional coordinate values of x/c and y/c within the ranges set forth in Table 2, the second airfoil has a profile with non-dimensional coordinate values of x/c and y/c within the ranges set forth in Table 4, the third airfoil has a profile with non-dimensional coordinate values of x/c and y/c within the ranges set forth in Table 6, and the fourth airfoil has a profile with non-dimensional coordinate values of x/c and y/c within the ranges set forth in Table 8, wherein for each airfoil the x/c values represent locations on a chord line for the airfoil in relation to its trailing edge and the y/c values represent distances from the chord line for the airfoil to points on its suction and pressure sides.

These and other features of the present application will become apparent to one of ordinary skill in the art upon review of the following detailed description when taken in conjunction with the several drawing and the appended claims.

DETAILED DESCRIPTION OF THE INVENTION

Figure 1:
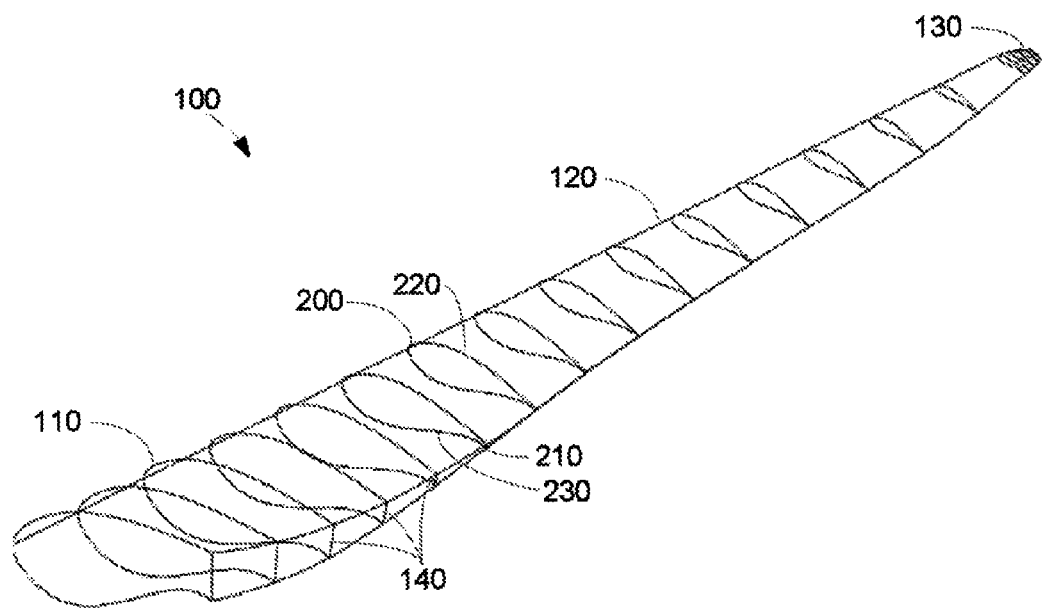
FIG. 1 is a perspective view of a blade as is described herein with a number of airfoils shown.

Referring now to the drawings, in which like numerals refer to like elements throughout the several views, embodiments of a turbine blade and airfoils for a turbine blade are described herein. The turbine blade may be a wind turbine blade. A wind turbine typically includes a number of wind turbine blades, such as two or three, associated with a hub. The rotation of the blades is transferred to the hub to capture energy.

FIG. 1 shows a blade 100 as is described herein. The blade 100 includes the inboard region 110 adjacent to the hub (not shown), an outboard region 120 or the middle portion, and a tip region 130. The inboard region 110 generally takes up about the first half of the blade 100 or so, the outboard region generally takes up about the next forty percent (40%) or so, and the tip 130 takes up about the final ten percent (10%) or so of the blade 100. The figures may vary. Although not shown, the blade 100 also may include a connector portion adjacent to the inboard region 110 in some embodiments. The connector portion may connect the turbine blade 100 to the hub and may have a cross-section that is circular, among other shapes.

Figure 2:
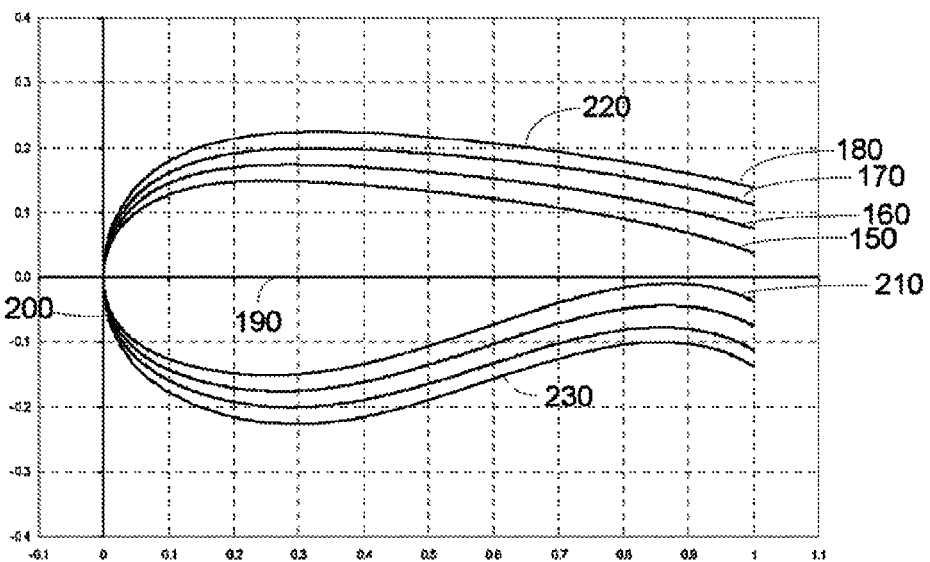
FIG. 2 is a composite plot of the airfoils as are described herein.

FIG. 2 shows a family of airfoils 140. The airfoils 140 are designed for the inboard region 110 of the blade 100. In this example, four (4) airfoils 140 are shown, a first airfoil 150, a second airfoil 160, a third airfoil 170, and a fourth airfoil 180. An infinite number of the airfoils 140 may be used. A chord line 190 extends from a leading edge 200 to a trailing edge 210 of each of the airfoils 140. In this example, the chord line 190 extends through the middle of the airfoils 140.

In this example, the trailing edges 210 are blunt or have a "flat back". The leading edges 200 are curved. Each airfoil 140 also includes a suction side 220 and a pressure side 230. Each suction side 220 has a substantially oval shape while each pressure side 230 has a substantially S-shape. The suction sides 220 and the pressure sides 230 do not intersect the chord line 190. Each of the airfoils 140 is connected by a smooth curve.

The turbine blade may define a rotor radius, which is a length of the turbine blade from a center of the hub to a tip of the turbine blade. Each airfoil 140 may have a cross-sectional area. The airfoils 140 may decrease in cross-sectional area along at least the inboard region of the turbine blade 100 in a direction extending away from the hub toward the tip (i.e. along the rotor radius). Thus, of the four airfoils 140, the first airfoil 150 has the smallest cross-sectional area and is located closest to the tip, while the fourth airfoil 180 has the largest cross-sectional area and is located closest to the hub.

Each airfoil 140 also may be associated with a chord length, meaning a width of the turbine blade 110 at the particular position of the airfoil along the length of the turbine blade 110. Stated alternatively, the chord length is the length of the chord line at the position of the airfoil along the rotor radius. The airfoils 140 having decreasing chord lengths along the turbine blade in a direction extending away from the hub, as the cross-sectional area of the airfoils decrease. The airfoils 140 also have decreasing thicknesses along the turbine blade in a direction extending away from the hub. The thickness is typically measured as a percentage of the airfoil chord length, with each airfoil having a maximum thickness at a particular location along the chord line.

The fourth airfoil 180 may have a radial location on the turbine blade 110 that is about 21 to 24% of the rotor radius, and the fourth airfoil 180 may have a maximum thickness that is about 45% of its chord length. The third airfoil 170 may have a radial location on the turbine blade 110 that is about 23 to 27% of the rotor radius, and the third airfoil 170 may have a maximum thickness that is about 40% of its chord length. The second airfoil 160 may have a radial location on the turbine blade 110 that is about 27 to 30% of the rotor radius, and the second airfoil 160 may have a maximum thickness that is about 35% of its chord length. The first airfoil 150 may have a radial location on the turbine blade 110 that is about 30 to 45% of the rotor radius, and the first airfoil 150 may have a maximum thickness that is about 30% of its chord length.

The specific shape of the first airfoil 150 is given in Table 1 in the form of dimensionless coordinates. The x/c values represent locations on the chord line 190 in relation to the trailing edge 210. The y/c values represent relative distances from the chord line 190 to points on either the suction side 220 or the pressure side 230. The values are scalable as a function of the same constant or number to provide a scaled up or scaled down airfoil.

TABLE 1

Dimensionless Coordinates for One Example of the First Airfoil

| x/c | y/c |
| --- | --- |
| 1.00000000 | 0.03726164 |
| 0.90036720 | 0.06785235 |
| 0.80067860 | 0.08990651 |
| 0.70007530 | 0.10734770 |
| 0.60106600 | 0.12091980 |
| 0.50066880 | 0.13214710 |
| 0.40005820 | 0.14126440 |
| 0.30031070 | 0.14733190 |
| 0.20042560 | 0.14654610 |
| 0.10049920 | 0.12712570 |
| 0.00000000 | 0.00000000 |

TABLE 1-continued

Dimensionless Coordinates for One Example of the First Airfoil

| x/c | y/c |
| --- | --- |
| 0.10065920 | −0.12659800 |
| 0.20022940 | −0.14866100 |
| 0.30009620 | −0.15000300 |
| 0.40096110 | −0.13401000 |
| 0.50042920 | −0.10618000 |
| 0.60041830 | −0.07248480 |
| 0.70074310 | −0.03982390 |
| 0.80018960 | −0.01648170 |
| 0.90094460 | −0.01118480 |
| 1.00000000 | −0.03773510 |

As is shown at the x=1 location, the trailing edge 210 of the airfoil 150 has a given width. That width narrows towards the x=0.9 position, continues to narrow and then expands until past the x=0.3 position. The shape again narrows towards the leading edge 200 in a largely oval shape and then returns towards the trailing edge 210.

Figure 3:
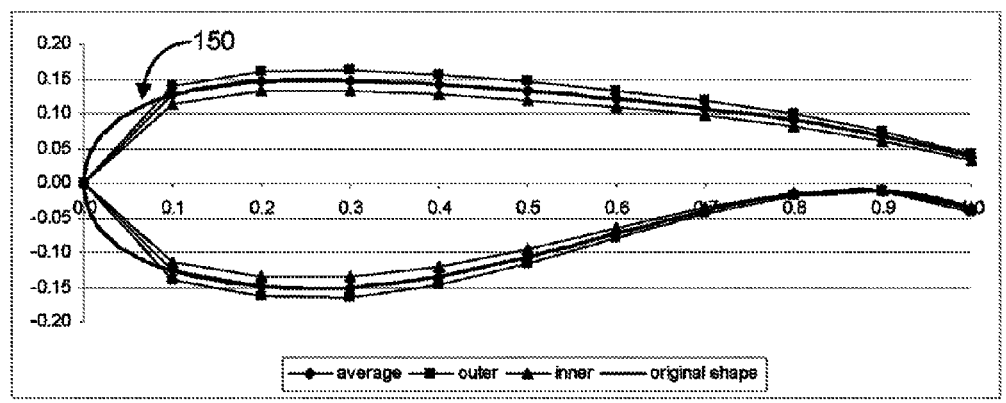
FIG. 3 is a plot illustrating ranges of dimensionless coordinate values for a first airfoil at certain locations along its chord line.

It should be noted that the first airfoil 150 need not have the exact configuration shown in FIG. 2 and described in Table 1. For example, Table 2 shows ranges of potential dimensionless coordinates for the suction side and the pressure side of the first airfoil 150, and FIG. 3 graphically illustrates these ranges with reference to the airfoil 150. It should be noted that FIG. 3 merely shows the y/c ranges about particular x/c positions, with the minimum and maximum y/c positions connected by straight lines. FIG. 3 does not show the actually shape of the airfoil, which is curved about the leading edge.

TABLE 2

Ranges of Dimensionless Coordinates for the First Airfoil

| x/c | Suction Side y/c | Pressure Side y/c |
| --- | --- | --- |
| 1.000 | 0.034 to 0.041 | −0.034 to −0.042 |
| 0.900 | 0.061 to 0.075 | −0.010 to −0.012 |
| 0.800 | 0.081 to 0.099 | −0.015 to −0.018 |
| 0.700 | 0.097 to 0.118 | −0.036 to −0.044 |
| 0.600 | 0.109 to 0.133 | −0.065 to −0.080 |
| 0.500 | 0.119 to 0.145 | −0.096 to −0.117 |
| 0.400 | 0.127 to 0.155 | −0.121 to −0.148 |
| 0.300 | 0.133 to 0.162 | −0.135 to −0.165 |
| 0.200 | 0.132 to 0.161 | −0.134 to −0.164 |
| 0.100 | 0.114 to 0.140 | −0.114 to −0.139 |
| 0.000 | 0.000 | 0.000 |

The second airfoil 160 is similar but somewhat thicker. As above, the second airfoil 160 also has the narrowing dip between the position x=1 and the position x=0.8. The shape of the second airfoil 160 is defined as follows:

TABLE 3

Dimensionless Coordinates for One Example of the Second Airfoil

| x/c | y/c |
| --- | --- |
| 1.00000000 | 0.07476157 |
| 0.90046010 | 0.10220790 |
| 0.80029790 | 0.12248030 |
| 0.70049780 | 0.13862410 |
| 0.60022080 | 0.15149490 |
| 0.50073840 | 0.16167160 |
| 0.40103380 | 0.16936190 |
| 0.30001950 | 0.17332270 |
| 0.20017300 | 0.16904810 |
| 0.10033560 | 0.14399980 |

TABLE 3-continued

Dimensionless Coordinates for One Example of the Second Airfoil

| x/c | y/c |
|---|---|
| 0.00000000 | 0.00000000 |
| 0.10085420 | −0.14364800 |
| 0.20034960 | −0.17120100 |
| 0.30024750 | −0.17597900 |
| 0.40050510 | −0.16227900 |
| 0.50051480 | −0.13568000 |
| 0.60100430 | −0.10275700 |
| 0.70074630 | −0.07116550 |
| 0.80063010 | −0.04891650 |
| 0.90051680 | −0.04553450 |
| 1.00000000 | −0.07523460 |

Figure 4:
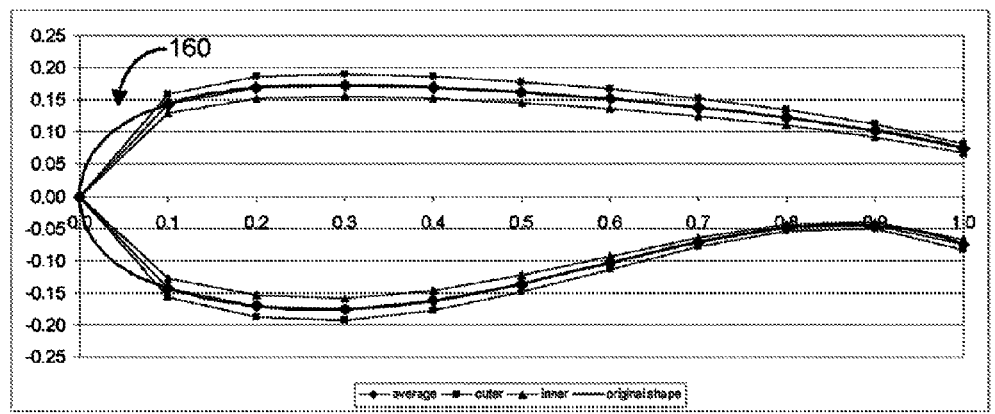
FIG. 4 is a plot illustrating ranges of dimensionless coordinate values for a second airfoil at certain locations along its chord line.

It should be noted that the second airfoil 160 need not have the exact configuration shown in FIG. 2 and described in Table 3. For example, Table 4 shows ranges of potential dimensionless coordinates for the suction side and the pressure side of the airfoil 160, and FIG. 4 graphically illustrates these ranges with reference to the airfoil 160. It should be noted that FIG. 4 merely shows the y/c ranges about particular x/c positions, with the minimum and maximum y/c positions connected by straight lines. FIG. 2 does not show the actually shape of the airfoil, which is curved about the leading edge.

TABLE 4

Ranges of Dimensionless Coordinates for the Second Airfoil

| x/c | Suction Side y/c | Pressure Side y/c |
|---|---|---|
| 1.000 | 0.067 to 0.082 | −0.068 to −0.083 |
| 0.900 | 0.092 to 0.113 | −0.041 to −0.050 |
| 0.800 | 0.110 to 0.135 | −0.044 to −0.054 |
| 0.700 | 0.125 to 0.153 | −0.064 to −0.079 |
| 0.600 | 0.136 to 0.167 | −0.093 to −0.113 |
| 0.500 | 0.146 to 0.178 | −0.122 to −0.149 |
| 0.400 | 0.152 to 0.186 | −0.146 to −0.179 |
| 0.300 | 0.156 to 0.191 | −0.158 to −0.194 |
| 0.200 | 0.152 to 0.186 | −0.154 to −0.188 |
| 0.100 | 0.129 to 0.158 | −0.129 to −0.157 |
| 0.000 | 0.000 | 0.000 |

The shape of the third airfoil 170 is similar to those described above, but again thicker. The third airfoil 170 also has the dip between the position x=1 and the position x=0.8. The shape of the third airfoil 170 is defined as follows:

TABLE 5

Dimensionless Coordinates for One Example of the Third Airfoil

| x/c | y/c |
|---|---|
| 1.00000000 | 0.11226081 |
| 0.90063769 | 0.13652491 |
| 0.80109208 | 0.15473962 |
| 0.70100077 | 0.16967702 |
| 0.60050336 | 0.18158922 |
| 0.50083265 | 0.19073012 |
| 0.40094014 | 0.19697082 |
| 0.30087793 | 0.19867672 |
| 0.20005762 | 0.19089852 |
| 0.10048941 | 0.16042992 |
| 0.00000000 | 0.00000000 |
| 0.10034881 | −0.15978302 |
| 0.20060802 | −0.19312702 |
| 0.30043493 | −0.20132002 |
| 0.40002894 | −0.18996502 |
| 0.50060705 | −0.16471402 |
| 0.60057116 | −0.13303101 |

TABLE 5-continued

Dimensionless Coordinates for One Example of the Third Airfoil

| x/c | y/c |
|---|---|
| 0.70081557 | −0.10227001 |
| 0.80004708 | −0.08139181 |
| 0.90013649 | −0.07984641 |
| 0.90125599 | −0.07998141 |
| 1.00000000 | −0.11273501 |

Figure 5:
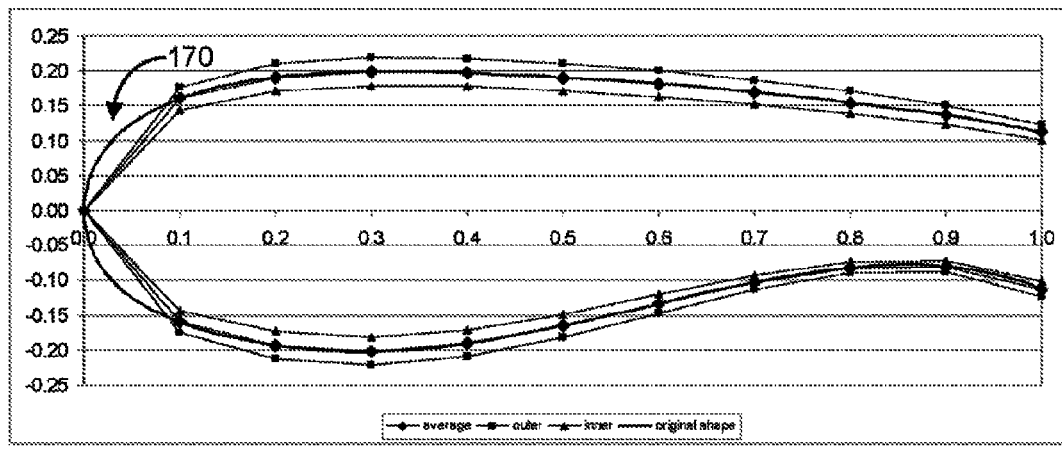
FIG. 5 is a plot illustrating ranges of dimensionless coordinate values for a third airfoil at certain locations along its chord line.

The third airfoil 170 need not have the exact configuration shown in FIG. 2 and described in Table 5. For example, Table 6 shows ranges of potential dimensionless coordinates for the suction side and the pressure side of the airfoil 170, and FIG. 5 graphically illustrates these ranges with reference to the airfoil 170. It should be noted that FIG. 5 merely shows the y/c ranges about particular x/c positions, with the minimum and maximum y/c positions connected by straight lines. FIG. 5 does not show the actually shape of the airfoil, which is curved about the leading edge.

TABLE 6

Ranges of Dimensionless Coordinates for the Third Airfoil

| x/c | Suction Side y/c | Pressure Side y/c |
|---|---|---|
| 1.000 | 0.101 to 0.123 | −0.101 to −0.124 |
| 0.900 | 0.123 to 0.150 | −0.072 to −0.088 |
| 0.800 | 0.139 to 0.170 | −0.073 to −0.090 |
| 0.700 | 0.153 to 0.187 | −0.092 to −0.113 |
| 0.600 | 0.163 to 0.200 | −0.120 to −0.147 |
| 0.500 | 0.172 to 0.210 | −0.148 to −0.181 |
| 0.400 | 0.177 to 0.217 | −0.171 to −0.209 |
| 0.300 | 0.179 to 0.219 | −0.181 to −0.221 |
| 0.200 | 0.172 to 0.210 | −0.174 to −0.212 |
| 0.100 | 0.144 to 0.176 | −0.144 to −0.175 |
| 0.000 | 0.000 | 0.000 |

The shape of the fourth airfoil 180 is similar to that as described above, but again thicker. The fourth airfoil 180 has the dip between the position x=1 and the position x=0.8. The shape of the fourth airfoil 180 is defined as follows:

TABLE 7

Dimensionless Coordinates for One Example of the Fourth Airfoil

| x/c | y/c |
|---|---|
| 1.00000000 | 0.13726020 |
| 0.90000000 | 0.15989241 |
| 0.80000000 | 0.17787950 |
| 0.70000000 | 0.19334258 |
| 0.60000000 | 0.20609266 |
| 0.50000000 | 0.21607175 |
| 0.40000000 | 0.22261591 |
| 0.30000000 | 0.22363103 |
| 0.20000000 | 0.21369481 |
| 0.10000000 | 0.17827485 |
| 0.00000000 | 0.00002100 |
| 0.10000000 | −0.17758316 |
| 0.20000000 | −0.21583323 |
| 0.30000000 | −0.22630101 |
| 0.40000000 | −0.21557439 |
| 0.50000000 | −0.19017060 |
| 0.60000000 | −0.15766700 |
| 0.70000000 | −0.12602585 |
| 0.80000000 | −0.10435340 |
| 0.90000000 | −0.10306262 |
| 1.00000000 | −0.13773604 |

Figure 6:
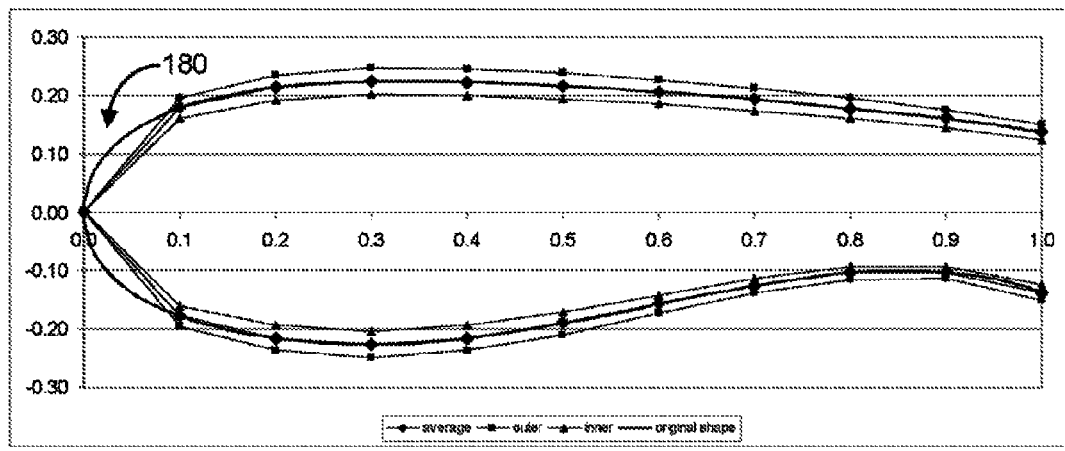
FIG. 6 is a plot illustrating ranges of dimensionless coordinate values for a fourth airfoil at certain locations along its chord line.

It should be noted that the fourth airfoil 180 need not have the exact configuration shown in FIG. 2 and described in Table 7. For example, Table 8 shows ranges of potential dimensionless coordinates for the suction side and the pressure side of the airfoil 180, and FIG. 6 graphically illustrates these ranges with reference to the airfoil 180. It should be noted that FIG. 6 merely shows the y/c ranges about particular x/c positions, with the minimum and maximum y/c positions connected by straight lines. FIG. 6 does not show the actually shape of the airfoil, which is curved about the leading edge.

TABLE 8

Ranges of Dimensionless Coordinates for the Fourth Airfoil

| x/c | Suction Side y/c | Pressure Side y/c |
|---|---|---|
| 1.000 | 0.124 to 0.151 | −0.124 to −0.152 |
| 0.900 | 0.144 to 0.176 | −0.093 to −0.113 |
| 0.800 | 0.160 to 0.196 | −0.094 to −0.115 |
| 0.700 | 0.174 to 0.213 | −0.113 to −0.139 |
| 0.600 | 0.185 to 0.227 | −0.142 to −0.173 |
| 0.500 | 0.194 to 0.238 | −0.171 to −0.209 |
| 0.400 | 0.200 to 0.245 | −0.194 to −0.237 |
| 0.300 | 0.201 to 0.246 | −0.204 to −0.249 |
| 0.200 | 0.192 to 0.235 | −0.194 to −0.237 |
| 0.100 | 0.160 to 0.196 | −0.160 to −0.195 |
| 0.000 | 0.000 | 0.000 |

By incorporating a relatively thick trailing edge 210, the extent of the pressure recovery on the airfoil suction surface is alleviated. Such permits the flow to remain attached so as to provide substantial lift performance. Specifically, lift coefficients greater than 3.0 have been measured. The airfoils 140 thus provide improved aerodynamic performance and efficiency with improved structural stiffness (bending moment of inertia). These improvements lead to increased energy capture and reduced blade weight. Indirectly, the airfoils 140 also minimize the aerodynamic compromise due to transportation constraints (max chord). The dip between the 1.0 and the 0.8 positions also reduces the overall weight as compared to known blunt trailing edge designs.

Thus, the present application provides a family of airfoils for a wind turbine blade. Each airfoil may include a blunt trailing edge, a substantially oval shaped suction edge, and a substantially S-shaped pressure side. The wind turbine blade is associated with a wind turbine hub, and the airfoils decrease in cross-sectional area along at least the inboard region of the turbine blade in a direction extending away from the wind turbine hub.

The airfoils may include a chord line extending from a leading edge to the blunt trailing edge. The substantially oval shaped suction sides and the substantially S-shaped pressure sides may not intersect the chord line. Each airfoil may include a first width about the blunt trailing edge, a second width moving towards a leading edge, with the second width being smaller than the first width, and a third width moving further towards the leading edge, with the third width being larger than the first width. Each airfoil may include a curved leading edge.

The suction sides may include non-dimensional coordinate values of x/c and positive y/c set forth in one of Tables 1, 3, 5, and 7, and the pressure sides may include non-dimensional coordinate values of x/c and negative y/c set forth in the same Table, the values of x/c representing locations on the chord line in relation to the trailing edge and the values of y/c representing heights from the chord line to points on the suction and pressure sides. Each of airfoils may be connected by a smooth curve.

A first airfoil may include a profile substantially in accordance with non-dimensional coordinate values of x/c and y/c set forth in Table 1. A second airfoil may include a profile substantially in accordance with non-dimensional coordinate values of x/c and y/c set forth in Table 3. A third airfoil may include a profile substantially in accordance with non-dimensional coordinate values of x/c and y/c set forth in Table 5. A fourth airfoil may include a profile substantially in accordance with non-dimensional coordinate values of x/c and y/c set forth in Table 7. Each airfoil may be an inboard region airfoil.

In another embodiment, a turbine blade may include a number of airfoils. The airfoils may include a first airfoil with a profile substantially in accordance with non-dimensional coordinate values of x/c and y/c set forth in Table 1, a second airfoil with a profile substantially in accordance with non-dimensional coordinate values of x/c and y/c set forth in Table 3, a third airfoil with a profile substantially in accordance with non-dimensional coordinate values of x/c and y/c set forth in Table 5, and a fourth airfoil with a profile substantially in accordance with non-dimensional coordinate values of x/c and y/c set forth in Table 7. The airfoils may be connected by a smooth curve. The x/c and y/c values may be scalable as a function of the same constant or number to provide a scaled up or scaled down airfoil. The airfoils may include a number of inboard region airfoils. The turbine blade may be a wind turbine blade.

Also in some embodiments, a wind turbine blade may include an inboard region, an outboard region, and a tip region. The inboard region may includes a number of airfoils. Each airfoil may include a blunt trailing edge, a substantially oval shaped suction side, and a substantially S-shaped pressure side. The airfoils may decrease in cross-sectional area along at least the inboard region of the turbine blade in a direction extending away from a wind turbine hub. Each airfoil further may include a chord line extending from a leading edge to the blunt trailing edge. On each airfoil, the substantially oval shaped suction side and the substantially S-shaped pressure side may not intersect its chord line. Each airfoil may be connected by a smooth curve. Each airfoil may include a first width about the blunt trailing edge, a second width moving towards a leading edge, the second width being smaller than the first width, and a third width moving further towards the leading edge, the third width being larger than the first width. Each airfoil may include a curved leading edge. The airfoils may include a first airfoil having a radial location on the turbine blade between about 30 to 45% of a turbine blade rotor radius and a maximum thickness of about 30% of first airfoil chord length, a second airfoil having a radial location on the turbine blade between about 27 to 30% of turbine blade rotor radius and a maximum thickness of about 35% of a second airfoil chord length, a third airfoil having a radial location on the turbine blade between about 23 to 27% of turbine blade rotor radius and a maximum thickness of about 40% of a third airfoil chord length, and a fourth airfoil having a radial location on the turbine blade between about 21 to 24% of turbine blade rotor radius and the maximum thickness of about 45% of a fourth airfoil chord length. In some embodiments, the substantially oval shaped suction sides have non-dimensional coordinate values of x/c and positive y/c within the ranges set forth in Tables 2, 4, 6, and 8, the x/c values representing locations on the chord lines in relation to the trailing edges and the positive y/c values representing distances from the chord lines to points on the suction sides. Also in some embodiments, the substantially S-shaped pressure sides have non-dimensional coordinate values of x/c and negative y/c within the ranges set forth in Tables 2, 4, 6, and 8, the x/c values representing locations on the chord lines in relation to the trailing edges and the negative y/c values representing distances from the chord lines to points on the pressure sides. In one embodiment, a first of the airfoils has a profile substantially in accordance with the ranges of non-dimensional coordinate values of x/c and y/c set forth in Table 2, the x/c values representing locations on the chord line in relation to the trailing edge and the y/c values representing distances from the chord line to points on the suction and pressure sides. In another embodiment, a second of the airfoils has a profile substantially in accordance with the ranges of non-dimensional coordinate values of x/c and y/c set forth in Table 4, the x/c values representing locations on the chord line in relation to the trailing edge and the y/c values representing distances from the chord line to points on the suction and pressure sides. In an additional embodiment, a third of the airfoils has a profile substantially in accordance with the ranges of non-dimensional coordinate values of x/c and y/c set forth in Table 6, the x/c values representing locations on the chord line in relation to the trailing edge and the y/c values representing distances from the chord line to points on the suction and pressure sides. In a further embodiment, a fourth of the plurality airfoils has a profile substantially in accordance with the ranges of non-dimensional coordinate values of x/c and y/c set forth in Table 8, the x/c values representing locations on the chord line in relation to the trailing edge and the y/c values representing distances from the chord line to points on the suction and pressure sides.

In additional embodiments, a turbine blade has a plurality of airfoils, including a first airfoil, a second airfoil, a third airfoil, and a fourth airfoil. The first airfoil has a profile with non-dimensional coordinate values of x/c and y/c within the ranges set forth in Table 2, the second airfoil has a profile with non-dimensional coordinate values of x/c and y/c within the ranges set forth in Table 4, the third airfoil has a profile with non-dimensional coordinate values of x/c and y/c within the ranges set forth in Table 6, and the fourth airfoil has a profile with non-dimensional coordinate values of x/c and y/c within the ranges set forth in Table 8, wherein for each airfoil the x/c values represent locations on a chord line for the airfoil in relation to its trailing edge and the y/c values represent distances from the chord line for the airfoil to points on its suction and pressure sides.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. A plurality of airfoils for a wind turbine blade, the wind turbine associated with a wind turbine hub, each airfoil comprising:
    a leading edge;
    a blunt trailing edge;
    a chord line extending from the leading edge to the blunt trailing edge;
    a substantially oval shaped suction side; and
    a substantially S-shaped pressure side, wherein the plurality of airfoils decrease in cross-sectional area along the turbine blade in a direction extending away from the wind turbine hub;
    wherein the substantially oval shaped suction sides comprise non-dimensional coordinate values of x/c and positive y/c within the ranges set forth in Tables 2, 4, 6, and 8, the x/c values representing locations on the chord lines in relation to the trailing edges and the positive y/c values representing distances from the chord lines to points on the suction sides;
    wherein the substantially S-shaped pressure sides comprise non-dimensional coordinate values of x/c and negative y/c within the ranges set forth in Tables 2, 4, 6, and 8, the x/c values representing locations on the chord lines in relation to the trailing edges and the negative y/c values representing distances from the chord lines to points on the pressure sides.

2. The plurality of airfoils of claim 1, wherein each substantially oval shaped suction side and substantially S-shaped pressure side does not intersect the chord line of the airfoil.

3. The plurality of airfoils of claim 1, wherein each of the plurality of airfoils is connected by a smooth curve.

4. The plurality of airfoils of claim 1, wherein each of the plurality of airfoils comprises a first width about the blunt trailing edge, a second width moving towards the leading edge, the second width being smaller than the first width, and a third width moving further towards the leading edge, the third width being larger than the first width.

5. The plurality of airfoils of claim 1, wherein each of the plurality of airfoils comprises a curved leading edge.

6. The plurality of airfoils of claim 1, each comprising an inboard region airfoil.

7. A wind turbine blade comprising:
    an inboard region comprising a plurality of airfoils, each airfoil comprising:
        a leading edge;
        a chord line extending from the leading edge to the blunt trailing edge;
        a blunt trailing edge;
        a substantially oval shaped suction side; and
        a substantially S-shaped pressure side, the plurality of airfoils decreasing in cross-sectional area along the turbine blade in a direction extending away from a wind turbine hub;
    an outboard region; and
    a tip region;
    wherein the substantially oval shaped suction sides comprise non-dimensional coordinate values of x/c and positive y/c within the ranges set forth in Tables 2, 4, 6, and 8, the x/c values representing locations on the chord lines in relation to the trailing edges and the positive y/c values representing distances from the chord lines to points on the suction sides;
    wherein the substantially S-shaped pressure sides comprise non-dimensional coordinate values of x/c and negative y/c within the ranges set forth in Tables 2, 4, 6, and 8, the x/c values representing locations on the chord lines in relation to the trailing edges and the negative y/c values representing distances from the chord lines to points on the pressure sides.

8. The wind turbine blade of claim 7, wherein on each airfoil the substantially oval shaped suction side and the substantially S-shaped pressure side does not intersect its chord line.

9. The wind turbine blade of claim 7, wherein each airfoil is connected by a smooth curve.

10. The wind turbine blade of claim 7, wherein each airfoil comprises a first width about the blunt trailing edge, a second width moving towards the leading edge, the second width being smaller than the first width, and a third width moving further towards the leading edge, the third width being larger than the first width.

11. The wind turbine blade of claim 7, wherein each airfoil comprises a curved leading edge.

12. The wind turbine blade of claim 7, wherein the plurality of airfoils include:

a first airfoil having a radial location on the turbine blade between about 30 to 45% of a turbine blade rotor radius in a direction extending away from a wind turbine hub and a maximum thickness of about 30% of the first airfoil chord length;

a second airfoil having a radial location on the turbine blade between about 27 to 30% of turbine blade rotor radius in a direction extending away from a wind turbine hub and a maximum thickness of about 35% of the second airfoil chord length;

a third airfoil having a radial location on the turbine blade between about 23 to 27% of turbine blade rotor radius in a direction extending away from a wind turbine hub and a maximum thickness of about 40% of the third airfoil chord length; and a fourth airfoil having a radial location on the turbine blade between about 21 to 24% of turbine blade rotor radius in a direction extending away from a wind turbine hub and the maximum thickness of about 45% of the fourth airfoil chord length.

13. The wind turbine blade of claim 7, wherein a first of the plurality airfoils comprises a profile substantially in accordance with the ranges of non-dimensional coordinate values of x/c and y/c set forth in Table 2, the x/c values representing locations on the chord line in relation to the trailing edge and the y/c values representing distances from the chord line to points on the suction and pressure sides.

14. The wind turbine blade of claim 7, wherein a second of the plurality airfoils comprises a profile substantially in accordance with the ranges of non-dimensional coordinate values of x/c and y/c set forth in Table 4, the x/c values representing locations on the chord line in relation to the trailing edge and the y/c values representing distances from the chord line to points on the suction and pressure sides.

15. The wind turbine blade of claim 7, wherein a third of the plurality airfoils comprises a profile substantially in accordance with the ranges of non-dimensional coordinate values of x/c and y/c set forth in Table 6, the x/c values representing locations on the chord line in relation to the trailing edge and the y/c values representing distances from the chord line to points on the suction and pressure sides.

16. The wind turbine blade of claim 7, wherein a fourth of the plurality airfoils comprises a profile substantially in accordance with the ranges of non-dimensional coordinate values of x/c and y/c set forth in Table 8, the x/c values representing locations on the chord line in relation to the trailing edge and the y/c values representing distances from the chord line to points on the suction and pressure sides.

17. A turbine blade having a plurality of airfoils, comprising:

a first airfoil comprising a profile with non-dimensional coordinate values of x/c and y/c within the ranges set forth in Table 2;

a second airfoil comprising a profile with non-dimensional coordinate values of x/c and y/c within the ranges set forth in Table 4;

a third airfoil comprising a profile with non-dimensional coordinate values of x/c and y/c within the ranges set forth in Table 6; and a fourth airfoil comprising a profile with non-dimensional coordinate values of x/c and y/c within the ranges set forth in Table 8, wherein for each airfoil the x/c values represent locations on a chord line for the airfoil in relation to its trailing edge and the y/c values represent distances from the chord line for the airfoil to points on its suction and pressure sides.

* * * * *